(12) United States Patent
Wimmer

(10) Patent No.: US 12,479,277 B2
(45) Date of Patent: Nov. 25, 2025

(54) WIND DEFLECTOR HAVING A VEHICLE-MOUNTED BASE FOR CONNECTING A DEFLECTOR ELEMENT

(71) Applicant: Webasto SE, Stockdorf (DE)

(72) Inventor: Rudolf Wimmer, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 353 days.

(21) Appl. No.: 18/041,334

(22) PCT Filed: Jul. 28, 2021

(86) PCT No.: PCT/EP2021/071121
§ 371 (c)(1),
(2) Date: Feb. 1, 2023

(87) PCT Pub. No.: WO2022/033871
PCT Pub. Date: Feb. 17, 2022

(65) Prior Publication Data
US 2024/0001745 A1    Jan. 4, 2024

(30) Foreign Application Priority Data
Aug. 13, 2020  (DE) .......................... 102020121321.2

(51) Int. Cl.
*B60J 7/22*    (2006.01)

(52) U.S. Cl.
CPC ...................................... *B60J 7/22* (2013.01)

(58) Field of Classification Search
CPC ....................................................... B60J 7/22
USPC ....................................................... 296/217
See application file for complete search history.

(56) References Cited

U.S. PATENT DOCUMENTS

| 2008/0246306 A1* | 10/2008 | Oerke ........................ B60J 7/22 |
| | | 296/180.1 |
| 2013/0193721 A1 | 8/2013 | Wimmer |
| 2015/0076869 A1 | 3/2015 | Nellen et al. |
| 2017/0282698 A1 | 10/2017 | Nishiba |

(Continued)

FOREIGN PATENT DOCUMENTS

| CN | 203172404 U | 9/2013 |
| CN | 203623343 U | 6/2014 |
| CN | 104340029 A | 2/2015 |

(Continued)

OTHER PUBLICATIONS

CN106660438 Text (Year: 2019).*
International Search Report for PCT/EP2021/071121 mailed Oct. 25, 2021, in English and German (6 pages).

*Primary Examiner* — Dennis H Pedder
(74) *Attorney, Agent, or Firm* — Fitch, Even, Tabin & Flannery, LLP

(57) ABSTRACT

A wind deflector for an openable vehicle roof having a displaceable lid element, the wind deflector having a deployable deflector element made of a flat, flexible material and a pivotable deploying bow, the lower edge of the deflector element being mounted on a vehicle-mounted base via a lower edge strip and the upper edge of the deflector element being mounted on a pivotable deploying bow. The vehicle-mounted base has a supporting portion on which a fastening strip is mounted. Across its length, the lower edge strip has a uniform cross section having a hook geometry which interacts with the fastening strip.

12 Claims, 12 Drawing Sheets

(56) References Cited

U.S. PATENT DOCUMENTS

2018/0208035 A1 7/2018 Wimmer et al.
2021/0206249 A1 7/2021 Shibue et al.

FOREIGN PATENT DOCUMENTS

| CN | 205239098 U | | 5/2016 | |
|----|----|----|----|----|
| CN | 205930181 U | | 2/2017 | |
| CN | 208411381 U | | 1/2019 | |
| CN | 106660438 B | * | 3/2019 | ............. B60J 7/043 |
| DE | 102010048964 A1 | | 4/2012 | |
| DE | 202012011194 U1 | | 2/2013 | |
| DE | 102011056732 A1 | | 6/2013 | |
| DE | 102018132128 A1 | | 6/2020 | |
| KR | 20200077644 A | | 7/2020 | |
| WO | 2017025153 A1 | | 2/2017 | |
| WO | 2020011632 A1 | | 1/2020 | |

* cited by examiner

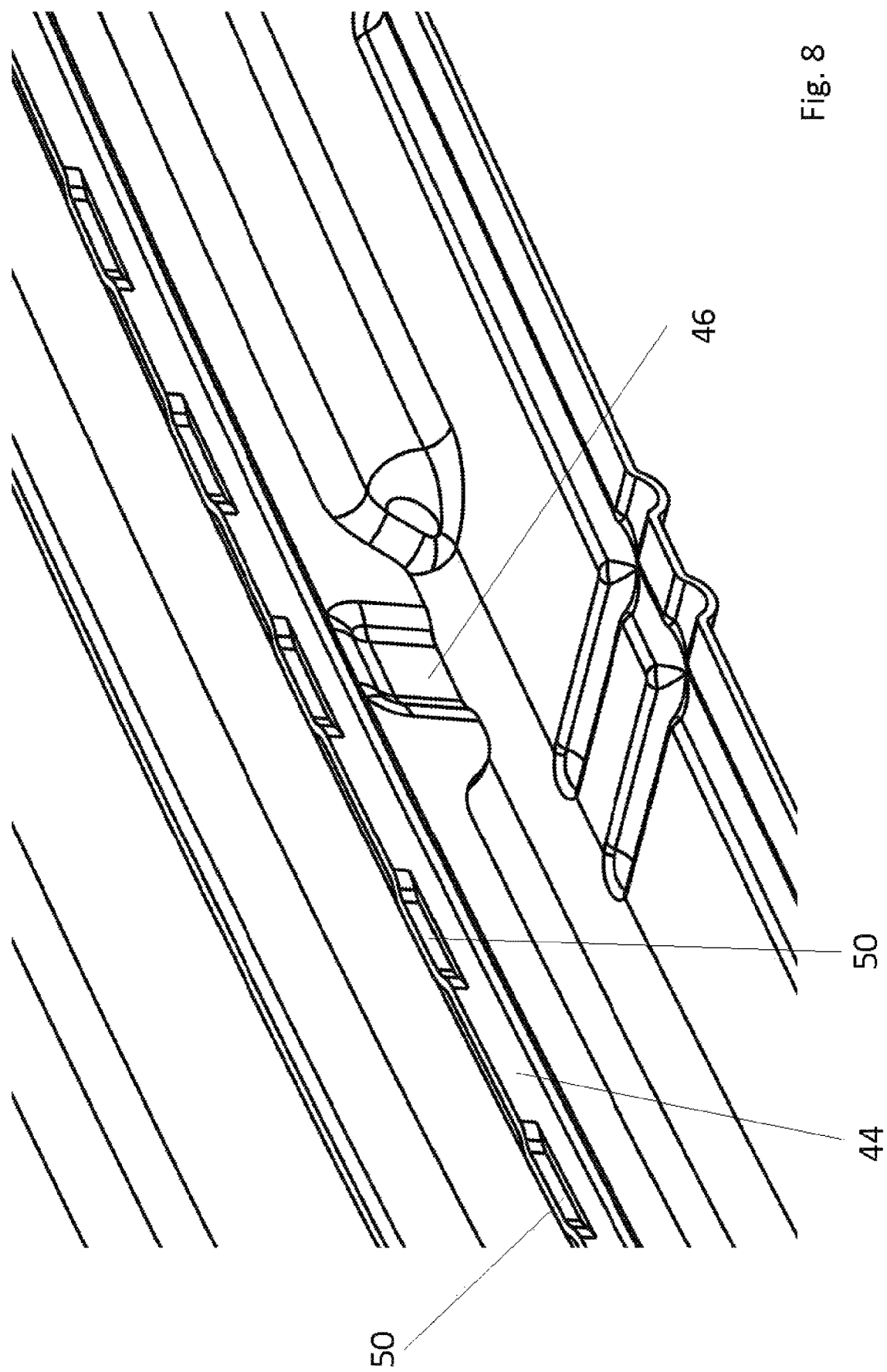

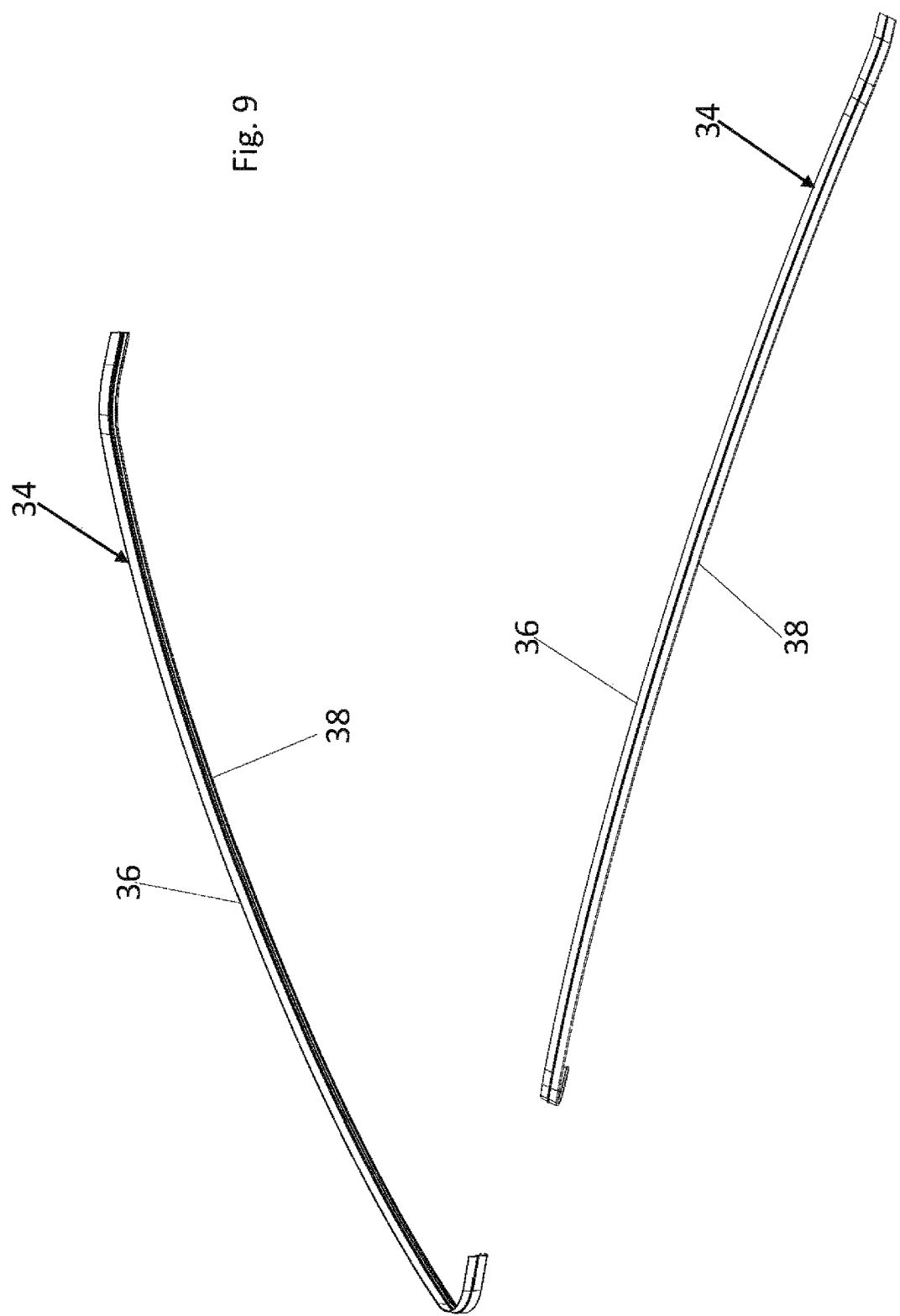

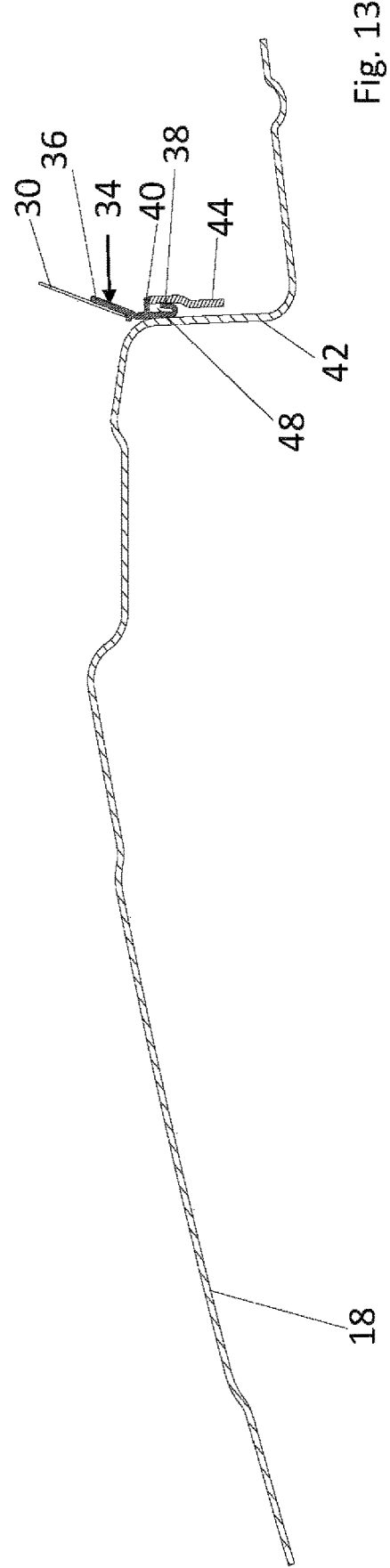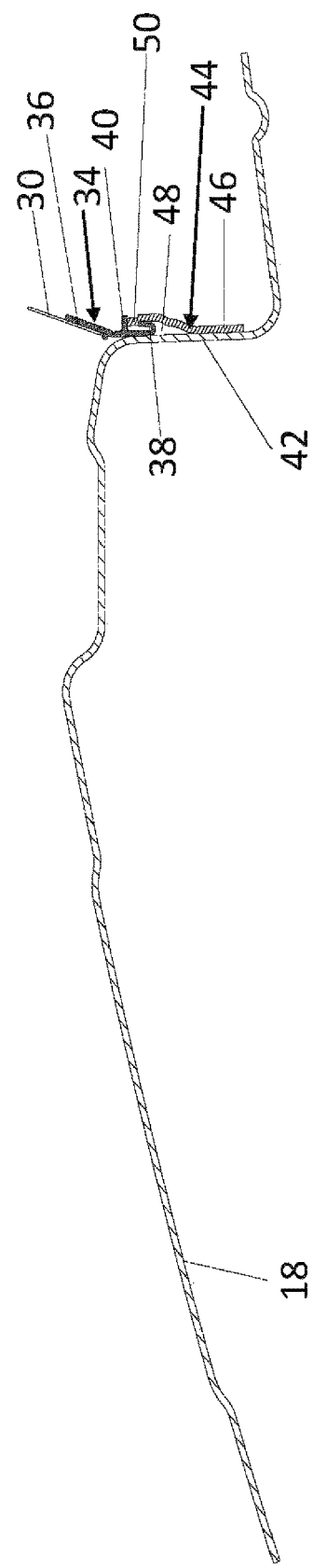

WIND DEFLECTOR HAVING A VEHICLE-MOUNTED BASE FOR CONNECTING A DEFLECTOR ELEMENT

CROSS-REFERENCE TO RELATED APPLICATIONS

This application is a U.S. national phase application filed under 35 U.S.C. § 371 of International Application No. PCT/EP2021/071121, filed Jul. 28, 2021, designating the United States, which claims priority from German Patent Application Number 10 2020 121 321.2, filed on Aug. 13, 2020, which are hereby incorporated herein by reference in their entirety for all purposes.

FIELD

The invention relates to a wind deflector for an openable vehicle roof having a displaceable lid element having the features of the preamble of patent claim 1.

BACKGROUND

A wind deflector of this kind is known from practice and is disposed in particular in the area of a front edge of a roof opening of a vehicle roof which can be either closed or at least partly released by means of a displaceable lid element. As a deflector element, the known wind deflector comprises, for example, a deployable mesh which is a flat, flexible material and which is connected at its lower edge via a lower edge strip to a vehicle-mounted base, which is formed by a roof frame or the like. At its upper edge, the deployable mesh is connected to a deploying bow, for example via an upper edge strip. The deploying bow has a U-shape and the free legs of said deploying bow, which each form a deploying arm, are mounted so as to be pivotable in the area of a respective roof-mounted guide rail for the lid element. Depending on the open position of the lid element, the deploying bow is pivotable between a pressed down resting position in which the deflector element is folded and a flared operating position in which the deflector element is stretched and forms a windward surface. The lower edge strip is formed beading-like and engages in a beading channel of the vehicle-mounted base. In particular, the lower edge strip is connected by a manual sewing process. In particular, the beading channel is formed by a plastic tub which is mounted on the vehicle-mounted base and which can be formed by a steel frame. The plastic tub is produced according to an injection molding process, such that a costly tool is required for the production. Additionally, the plastic tub requires assembly space in the longitudinal roof direction, which in turn is disadvantageous for the size of the roof opening in the longitudinal roof direction.

SUMMARY

The object of the invention is to propose a wind deflector in which connecting a foldable deflector element to a vehicle-mounted base is associated with little installation space in the longitudinal roof direction.

According to the invention, this object is attained by the wind deflector having the features of patent claim 1.

According to the invention, it is thus proposed that a fastening strip is disposed on a supporting portion of the vehicle-mounted base and the lower edge strip of the deflector element has a hook geometry, such that the deflector element can be hooked in the fastening strip, which is mounted on the supporting portion. The fastening strip can be very thin, which in turn is positive for the required installation space in the longitudinal roof direction. Thus, fastening the deflector element on the vehicle-mounted base does not impair or only slightly impairs the maximally available see-through portion which is predefined by the roof opening of the vehicle roof. By using the fastening strip, a groove, in which the lower edge strip can be inserted, is created by the interaction with the supporting portion. The hook geometry prevents the deflector element from detaching from the vehicle-mounted base when loaded. Thus, the deflector element is secured on the vehicle-mounted base or the fastening strip by the hook geometry.

In a specific embodiment of the wind deflector according to the invention, the fastening strip has locking protrusions, which the hook geometry of the lower edge strip of the deflector element engages from behind. In particular, the locking protrusions protrude in a gap or space which is formed between the supporting portion of the vehicle-mounted base and the fastening strip and in which the lower edge strip of the deflector element is inserted.

In an embodiment which can be produced cost-effectively, the locking protrusions are formed by a notch of the fastening strip.

The fastening strip can be made of any dimensionally table material. In particular, however, the fastening strip is made of a sheet metal and formed as a punched/bent part, for example.

To ensure that the deflector element is connected to the vehicle-mounted base across its entire length, the fastening strip preferably has a U-shape which corresponds to the shape of the lower edge strip of the deflector element. Across its entire length, the fastening strip together with the supporting portion forms the gap in which the lower edge strip of the deflector element can be inserted.

The fastening strip can be particularly easily assembled if it is mounted on a surface of the supporting portion which faces a roof opening, which can be either closed or released by means of the displaceable lid element. The fastening strip can be welded, riveted, screwed, soldered or glued to the supporting portion.

In a preferred embodiment, the supporting portion of the vehicle-mounted base is formed by a roof frame, on which in particular the deploying bow is mounted so as to be pivotable and which also defines the roof opening, which forms the see-through portion of the respective vehicle roof.

To define and to limit the insertion depth of the lower edge strip in the space or gap between the supporting portion and the fastening strip, the lower edge strip can have a stop rib which abuts on the fastening strip, in particular on an upper edge surface of the fastening strip.

To ensure that, on the one hand, the lower edge strip is deformable for the assembly and, on the other hand, hooks to the fastening strip, it is made of a resilient material, in particular also a rubber-elastic material, in a specific embodiment of the wind deflector according to the invention.

In a particularly cost-effective embodiment of the wind deflector according to the invention, the lower edge strip is an extrusion profile.

The invention also relates to a vehicle roof which comprises a roof opening and a wind deflector of the kind described above.

Further advantages and advantageous embodiments of the subject matter of the invention can be derived from the description, the drawing and the patent claims.

BRIEF DESCRIPTIONS OF THE DRAWINGS

Embodiments of the subject matter of the invention are illustrated schematically simplified in the drawing and are described in more detail hereinafter.

FIG. 8 shows an enlarged view of the area VIII in FIG. 7;

FIG. 9 shows a first perspective view of the lower edge strip of the deflector element;

FIG. 10 shows a second perspective view of the lower edge strip of the deflector element;

FIG. 13 shows a cut through the roof frame and the deflector element along the line XIII-XIII in FIG. 5;

FIG. 14 shows a cut through the roof frame and the deflector element along the line XIV-XIV in FIG. 5;

DETAILED DESCRIPTION

Figure 1:
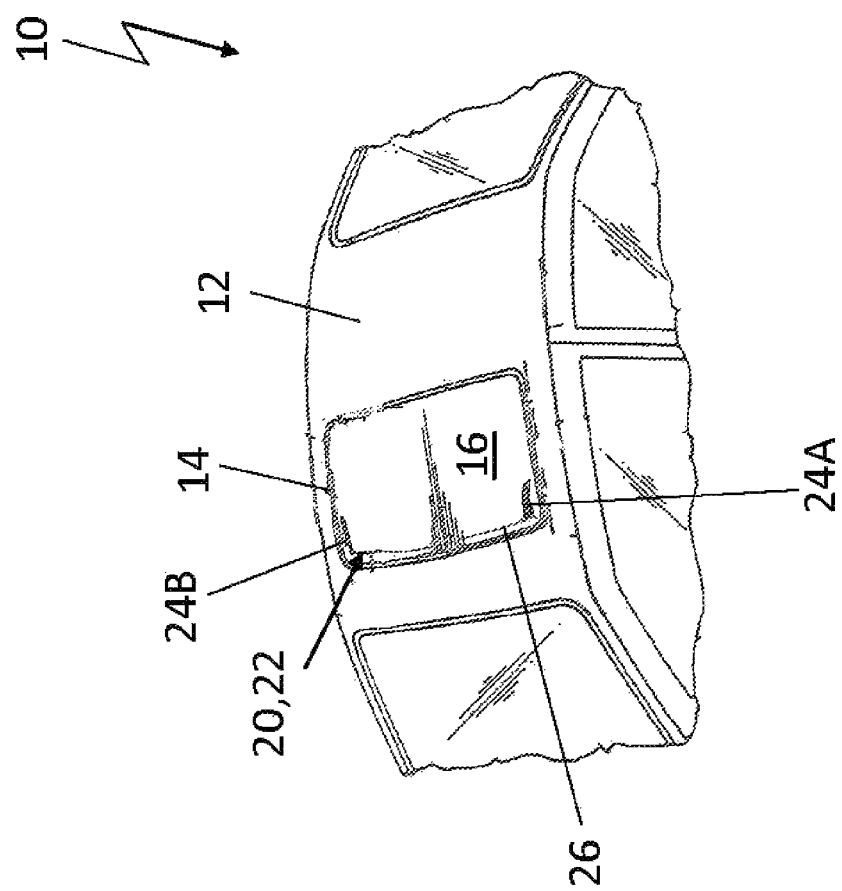
FIG. 1 shows a perspective top view of a vehicle roof having a wind deflector according to the invention.
Figure 2:
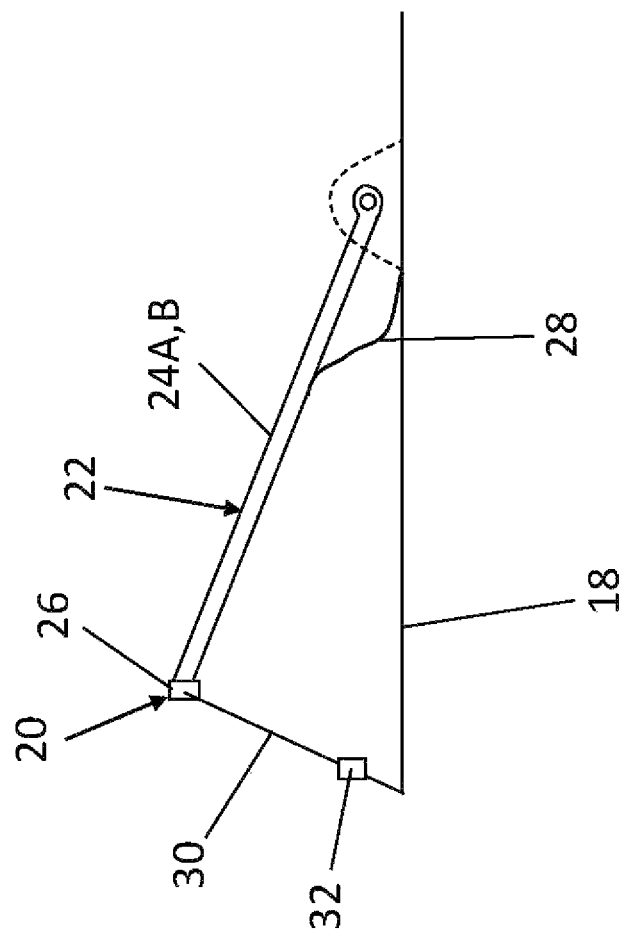
FIG. 2 shows a schematic side view of the wind deflector.

FIG. 1 shows a motor vehicle 10 which has a vehicle roof 12 provided with a roof opening 14 which can be either closed or at least partly released by means of a displaceable lid element 16.

Figure 4:
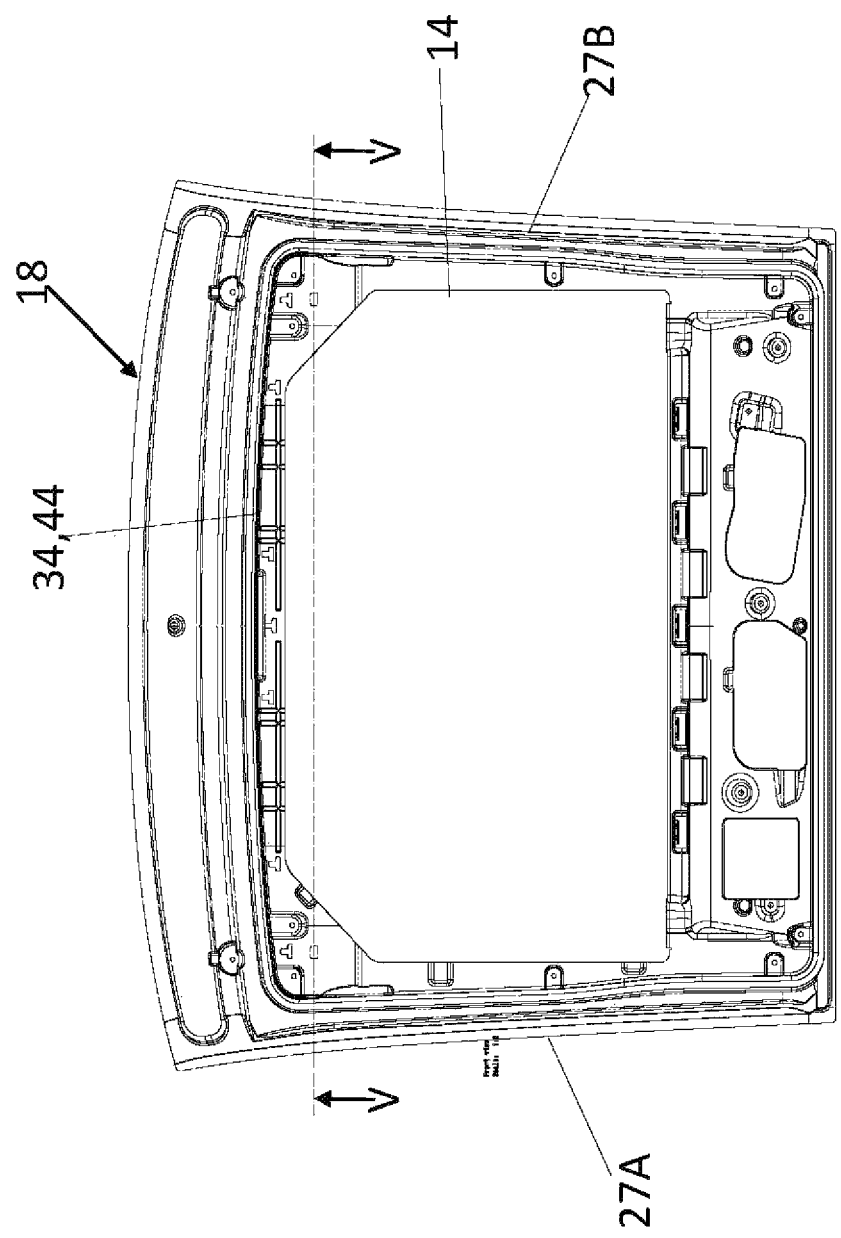
FIG. 4 shows a top view of the roof frame.
Figure 5:
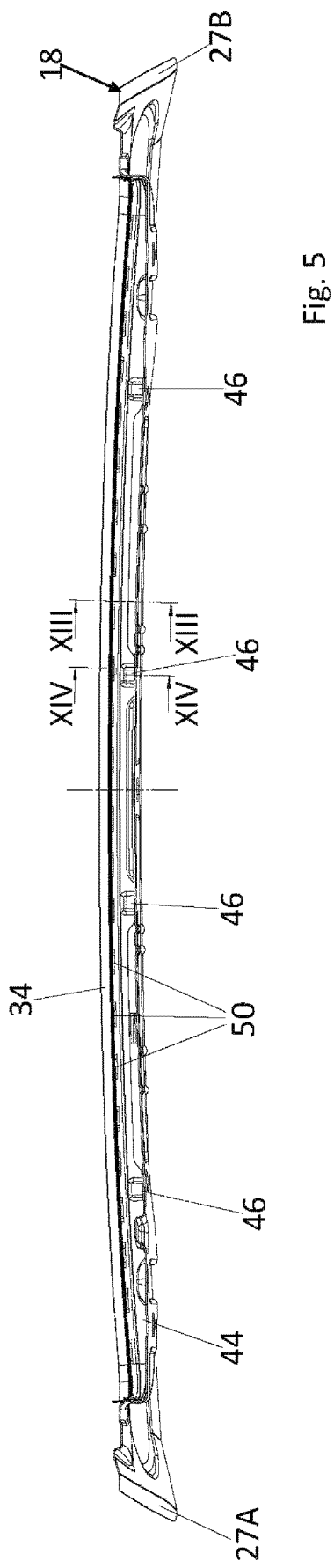
FIG. 5 shows a cut through the roof frame along the Line V-V in FIG. 4.
Figure 6:
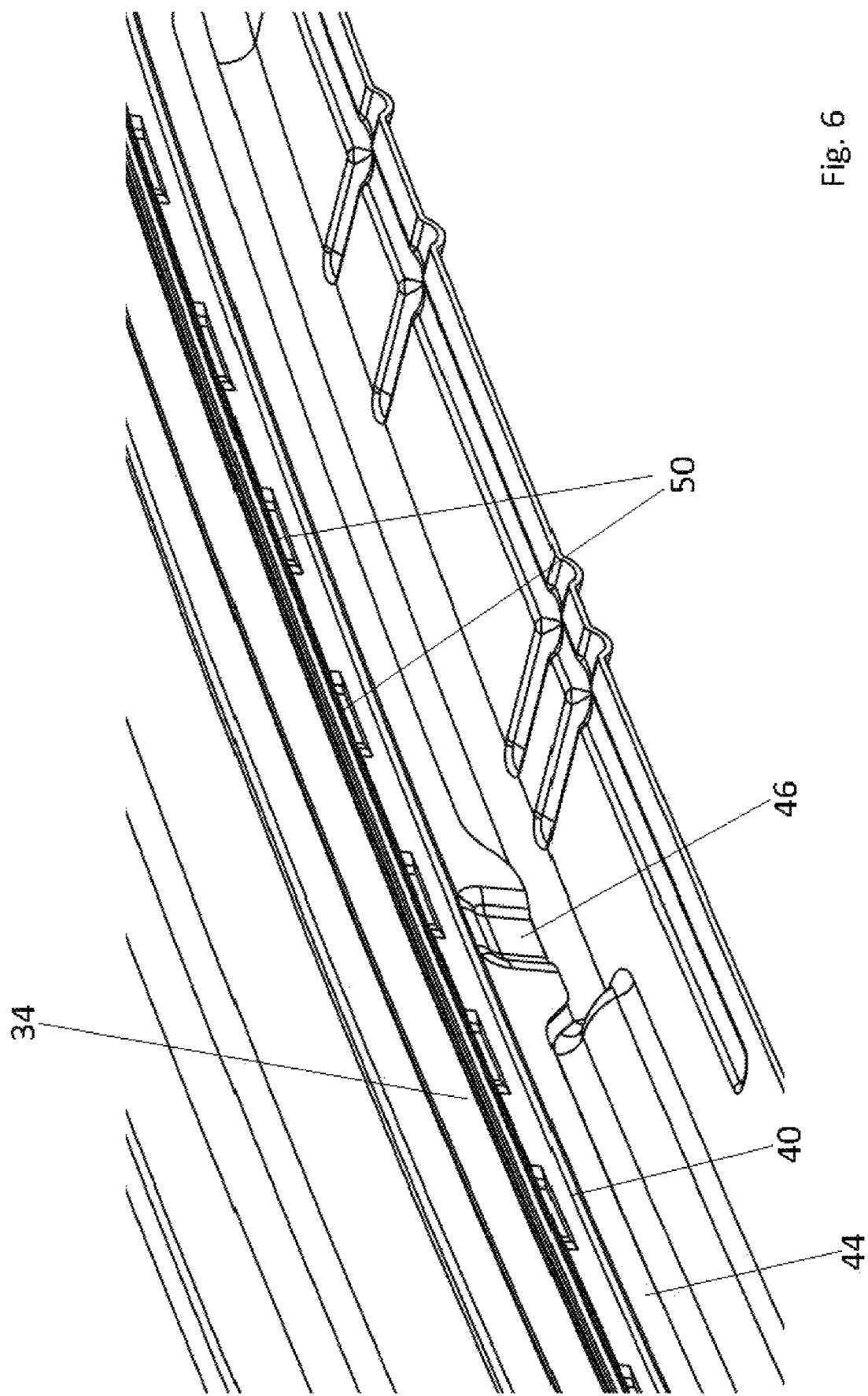
FIG. 6 shows an enlarged view of the area VI in FIG. 3.

Lid element 16 is part of a roof opening system which has displacement kinetics guided in guide rails (not shown), which are disposed on either side of a vertical longitudinal center vehicle plane of roof opening 14 for displacing lid element 16. The guide rails are disposed on a roof frame 18 which is shown in the FIGS. 3 to 5 and which limits roof opening 14. A wind deflector 20 which is deployable depending on the position of lid element 16 is disposed adjacent to a front edge portion of roof opening 14, said wind deflector 20 essentially extending in the transverse vehicle direction and being described in more detail hereinafter. Wind deflector 20 can prevent the formation of possible disruptive airflows and air turbulences in the vehicle interior of motor vehicle 10 when roof opening 14 is open, i.e., lid element 16 is retracted.

Wind deflector 20 comprises a deploying bow 22 which, in the broadest sense, has a U-shape in the transverse roof direction and which has two legs 24A and 24B serving as deploying arms which are connected to each other via a transverse leg 26 extending in the transverse vehicle direction. Legs 24A and 24B are each mounted so as to be pivotable at their ends facing away from transverse leg 26 in the area of a longitudinal rail 27A or 27B of roof frame 18 and are each prestressed in the deploying direction, for example by means of a deploying spring 28. The degree of deployment of legs 24A and 24B and thus of deploying bow 22 is defined by the position of lid element 16 in a longitudinal vehicle direction. Lid element 16 acts jointly with deploying bow 22 such that when roof opening 14 is closed, starting from an opening or release position, it drives onto legs 24A and 24B from behind and presses it downwards into a resting position against the force of deploying spring 28. However, when moving lid element 16 from the closing position closing roof opening 14 into the release position, legs 24A and 24B are released, such that deploying bow 22 can automatically swivel out into a functional position because of the effect of deploying springs 28 acting on legs 24A and 24B.

Wind deflector 20 which is described in more details by means of FIGS. 2 to 16 comprises a deflector element 30 which is made of a woven fabric or mesh and which is formed by a flat, flexible and foldable material. At its upper edge, deflector element 30 is connected to deploying bow 22, for example by means of a beading. At its lower edge, deflector element 30 is connected to roof frame 18 via a fastening system 32 which forms a vehicle-mounted base of wind deflector 20. In the deployed state of deploying bow 22, deflector element 30 is stretched between deploying bow 22 and roof frame 18. In the lowered state of deploying bow 22, deflector element 30 is disposed between pressed down deploying bow 22 and roof frame 18 in a folded shape.

Fastening system 32, by means of which deflector element 30 is connected to roof frame 18, comprises a lower edge strip 34, which is an extrusion profile and has a strip-shaped fastening area 36, via which it is connected to the lower edge portion of deflector element 30. Lower edge strip 34 can be sewn, glued or welded to deflector element 30.

Furthermore, lower edge strip 34, which is made of a resilient or rubber-elastic material, comprises a lower locking portion 38, which has a hook geometry in cross section, and a stop rib 40 limiting locking portion 38 at the top. Lower edge strip 34 has a constant cross section across its length.

Roof frame 18, which forms the vehicle-mounted base of wind deflector 20 and which is formed as a steel frame, has an essentially vertically aligned wall portion 42, which constitutes an inner wall which extends in the transverse vehicle direction and which faces roof opening 14. A fastening strip 44, which is formed as a punched/bent part and which can also be made of steel or any other metallic material, is fixed to wall portion 42. Thus, wall portion 42 is a supporting portion for fastening strip 44.

Fastening strip 44 has lower, tab-like fixing portions 46, at which it is welded to wall portion 42. Alternatively, fastening strip 44 can also be riveted or screwed to wall portion 42 of roof frame 18.

Above fixing portion 46, together with wall portion 42, fastening strip 44 limits a receiving gap 48 for locking portion 38 of lower edge strip 34. To be able to accommodate lower edge strip 34 or its locking portion 38 in receiving gap 48 in such a manner that it cannot be pulled out, the upper edge portion of fastening strip 44 has notches 50 which protrude in the direction of wall portion 42 and which are engaged from behind by hook-shaped locking portion 38 of lower edge strip 34. Across the length of fastening strip 44, notches 50 are formed at regular intervals.

Figure 3:
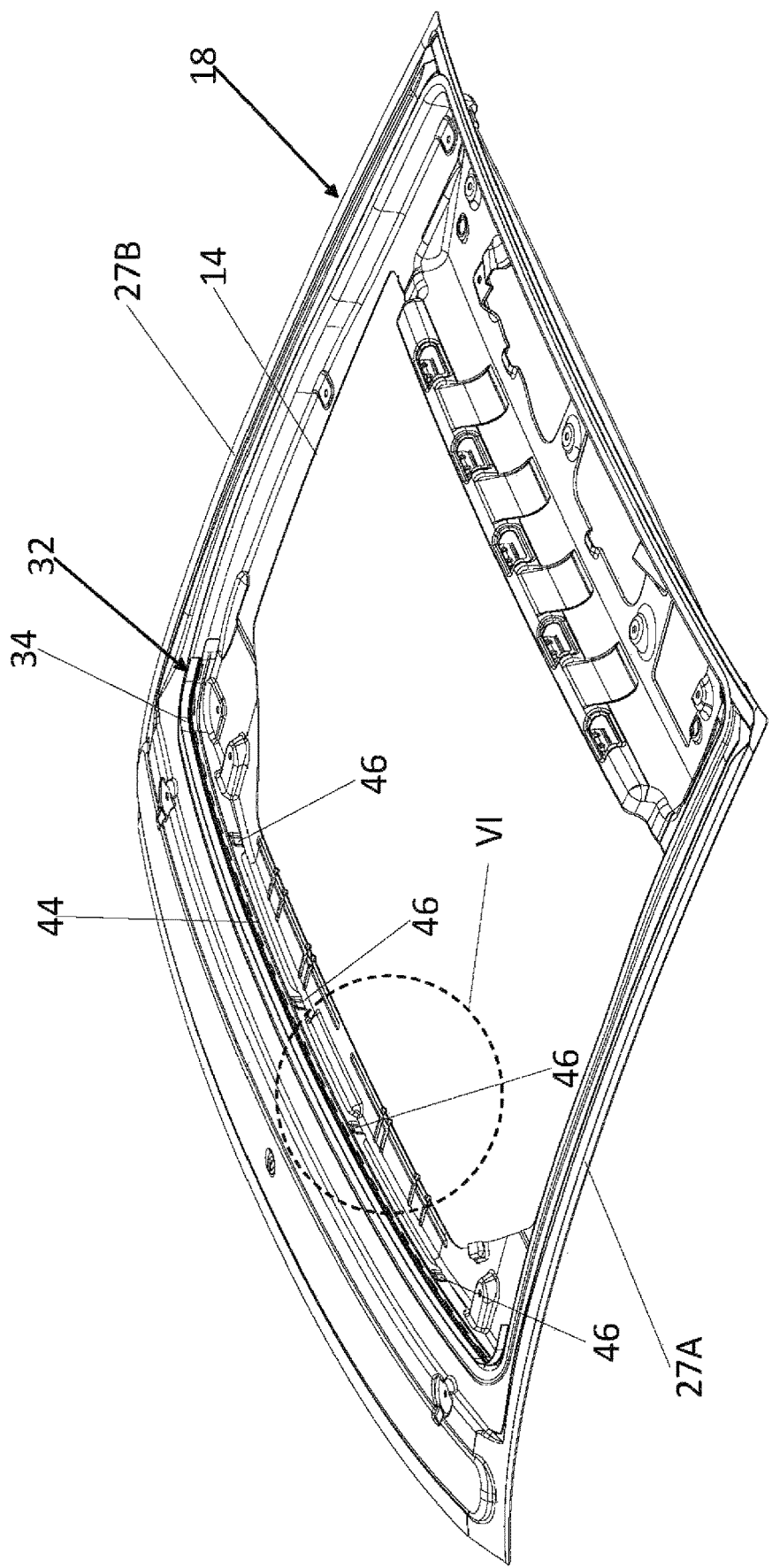
FIG. 3 shows a perspective view of a roof frame of the vehicle roof having a fastening system for a wind deflector mesh.
Figure 7:
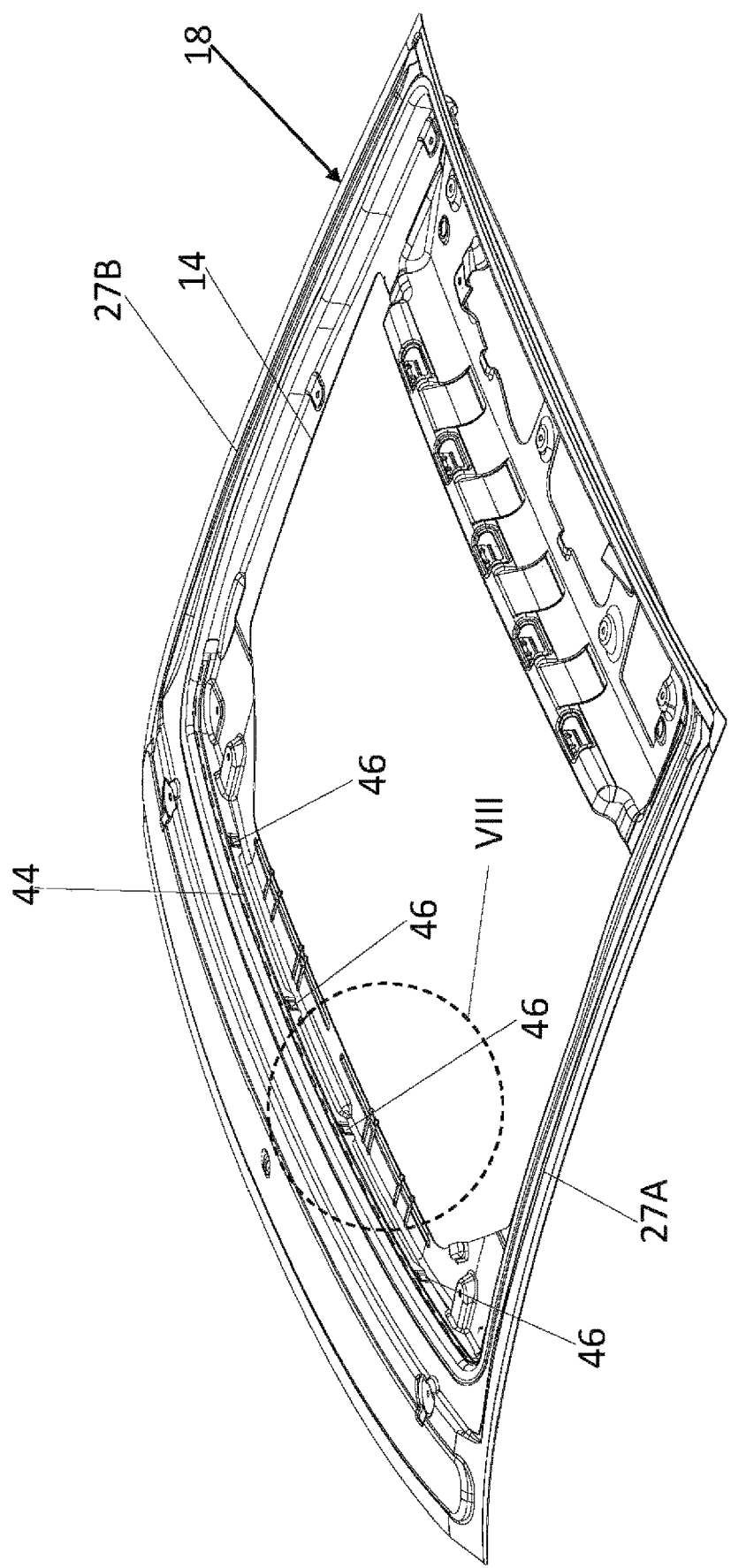
FIG. 7 shows a view of the roof frame corresponding to FIG. 3 but without a lower edge strip of a deflector element.
Figure 11:
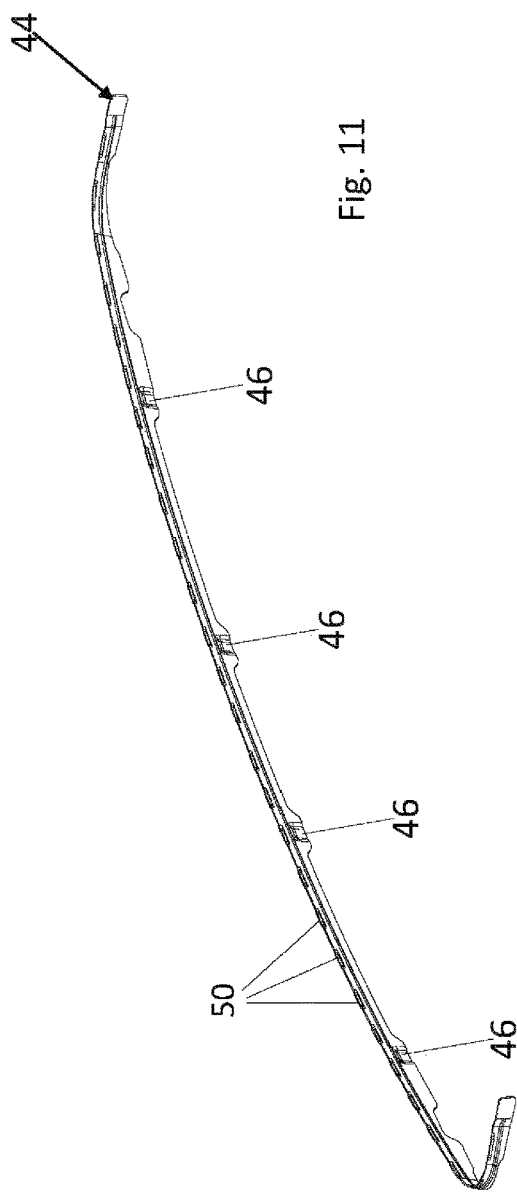
FIG. 11 shows a first perspective view of a fastening strip of the roof frame.
Figure 12:
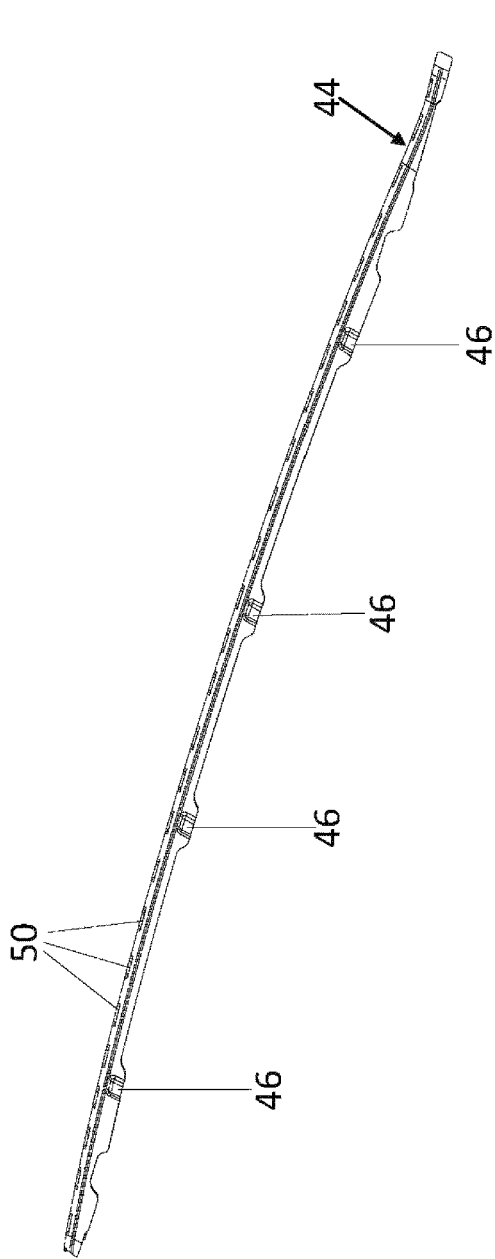
FIG. 12 shows a second perspective view of the fastening strip of the roof frame.

As can be taken from FIGS. 9 to 12, fastening strip 44 and lower edge strip 34 are each U-shaped in the broadest sense and each have a transverse leg which extends in the transverse roof direction, and two free end legs which extend in the area of longitudinal rails 27A and 27B of roof frame 18 in the longitudinal roof direction (cf. FIGS. 3 and 7).

For the assembly of wind deflector 20, lower edge strip 34 mounted on deflector element 30 is inserted into receiving gap 48 between wall portion 42 and fastening strip 44 from above until stop rib 40 strikes the upper edge of fastening strip 44. Subsequently, hook-like locking portion 38 of lower edge strip 34 spreads apart such that it engages beneath notches 50, whereby deflector element 30 is mounted on roof frame 18 in such a manner that it cannot be pulled out.

Figure 15:
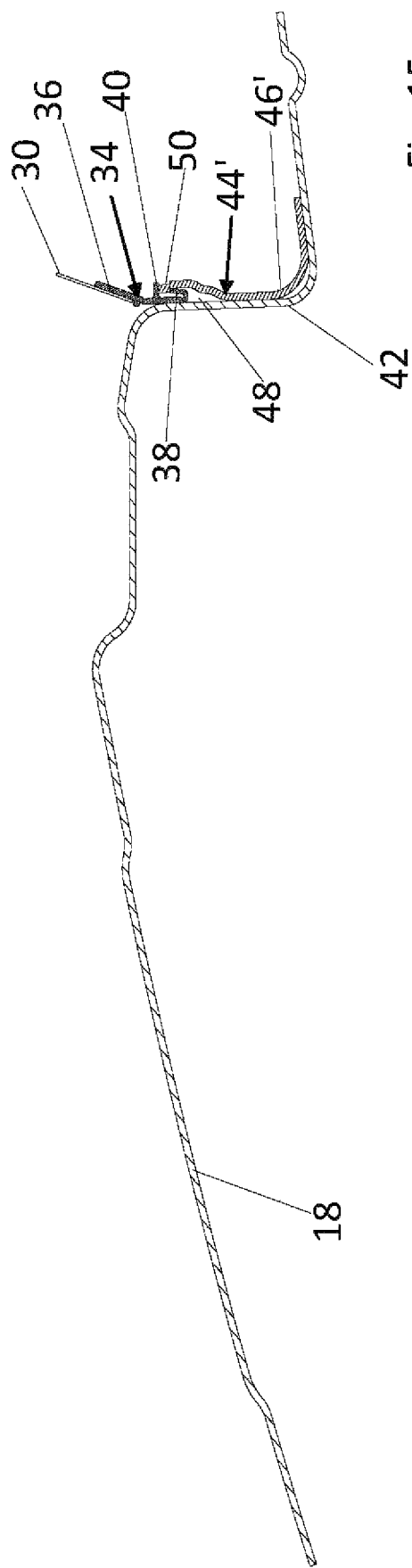
FIG. 15 shows a cut through a roof frame corresponding to FIG. 14 but for an alternative embodiment of a fastening strip.
Figure 16:
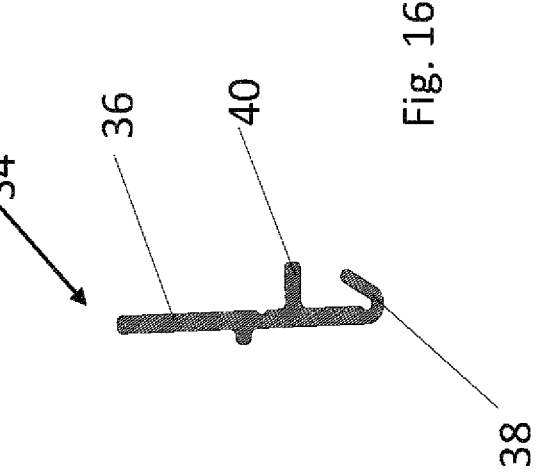
FIG. 16 shows a cut through the lower edge strip of the deflector element in isolation.

FIG. 15 shows an embodiment of a fastening strip 44' which largely corresponds to the fastening strip described above, but which differs from said fastening strip in that it has tab-like fixing portions 46' protruding downward which are L-shaped and which thus provide a larger contact surface for connection to the roof frame compared to the fixing portions described above.

The invention claimed is:

1. A wind deflector for an openable vehicle roof having a displaceable lid element, the wind deflector comprising:
    a deployable deflector element made of a flat, flexible material and a pivotable deploying bow,
    the lower edge of the deflector element being mounted on a vehicle-mounted base via a lower edge strip and the upper edge of the deflector element being mounted on the pivotable deploying bow,
    wherein the vehicle-mounted base comprises a supporting portion on which a fastening strip is mounted, and, across its length, the lower edge strip has a uniform cross section having a hook geometry which interacts with the fastening strip,
    wherein the fastening strip has multiple locking protrusions, which engages the hook geometry of the lower edge strip from behind,
    wherein each locking protrusion is formed by a notch of the fastening strip, and
    wherein the notches are distributed across the length of the fastening strip.

2. The wind deflector according to claim 1, wherein the fastening strip comprises a metallic material.

3. The wind deflector according to claim 1, wherein the fastening strip is a punched/bent part.

4. The wind deflector according to claim 1 wherein the fastening strip has a U-shape which corresponds to the shape of the lower edge strip of the deflector element.

5. The wind deflector according to claim 1, wherein the fastening strip is mounted on a surface of the supporting portion facing a roof opening.

6. The wind deflector according to claim 1, wherein the supporting portion is formed by a roof frame on which the deploying bow is mounted so as to be pivotable.

7. The wind deflector according to claim 1, wherein the lower edge strip has a stop rib which abuts on the fastening strip.

8. The wind deflector according to claim 1, wherein the lower edge strip is made of a resilient material.

9. The wind deflector according to claim 1, wherein the lower edge strip is an extrusion profile.

10. A vehicle roof comprising a roof opening and a wind deflector according to claim 1.

11. The wind deflector according to claim 2, wherein the metallic material is sheet metal.

12. The wind deflector according to claim 5, wherein the fastening strip is mounted on a surface of the supporting portion facing a roof opening by a weld.

\* \* \* \* \*